(12) United States Patent
Wechsler et al.

(10) Patent No.: US 8,073,963 B1
(45) Date of Patent: Dec. 6, 2011

(54) DATA STREAM CHANGE DETECTOR

(75) Inventors: Harry Wechsler, Fairfax, VA (US); Shen-Shyang Ho, Fairfax, VA (US)

(73) Assignee: George Mason Intellectual Properties, Inc., Fairfax, VA (US)

( * ) Notice: Subject to any disclaimer, the term of this patent is extended or adjusted under 35 U.S.C. 154(b) by 395 days.

(21) Appl. No.: 11/938,895

(22) Filed: Nov. 13, 2007

Related U.S. Application Data (60) Provisional application No. 60/865,465, filed on Nov. 13, 2006.

(51) Int. Cl.
    *G06F 15/16* (2006.01)
(52) U.S. Cl. .................................. 709/231
(58) Field of Classification Search ............. 709/231
    See application file for complete search history.

(56) References Cited

U.S. PATENT DOCUMENTS

| | | | | |
|---|---|---|---|---|
| 2003/0209893 | A1* | 11/2003 | Breed et al. ............... | 280/735 |
| 2008/0270329 | A1* | 10/2008 | Long et al. ................ | 706/12 |

OTHER PUBLICATIONS

Ho, S. 2005. A martingale framework for concept change detection in time-varying data streams. In Proceedings of the 22nd international Conference on Machine Learning (Bonn, Germany, Aug. 7-11, 2005). ICML '05, vol. 119. ACM, New York, NY, 321-327. DOI= doi.acm.org/10.1145/1102351.1102392.*

* cited by examiner

*Primary Examiner* — Joe Cheng
*Assistant Examiner* — Nicholas Jensen
(74) *Attorney, Agent, or Firm* — David Grossman; Edgar G. Rodriguez (57) ABSTRACT

A data stream change detector including a receiving module, a preprocessor module, a clustering module, a strangeness module, a p-value module, a martingale value determination module, comparison module, and an output module. The receiving module accepts new data vectors that originate from a sequence of data in a data stream. Preprocessor module preprocesses the new data vector using a filter. The clustering module clusters the new data vector with previously received data vectors. Strangeness module computes a strangeness value for each of the previously received data vectors. The p-value module calculates a p-value for the new data vector using the strangeness value. Martingale value determination module calculates a martingale value for the new data vector using the p-value. Comparison module compares the martingale value with a threshold value; and sets an indicator if a change if the martingale is greater than the threshold.

23 Claims, 9 Drawing Sheets

Frame 80

Frame 150

Frame 158

| Method | Video | anni | ugs | outdoor | indoor |
|---|---|---|---|---|---|
| | Length | 0:30 | 1:11 | 1:20 | 2:27 |
| | Frames | 913 | 2145 | 1202 | 2210 |
| | Shots | 17 | 13 | 18 | 26 |
| MT (20) | Precision | 0.933 | 0.857 | 0.824 | 0.686 |
| | Recall | 0.824 | 0.923 | 0.778 | 0.923 |
| | $F_1$ | 0.875 | 0.889 | 0.800 | 0.787 |
| HI | Precision | 0.813 | 0.733 | 0.889 | 0.622 |
| | Recall | 0.765 | 0.846 | 0.889 | 0.885 |
| | $F_1$ | 0.788 | 0.785 | 0.889 | 0.731 |
| $\chi^2$ | Precision | 1.000 | 0.706 | 0.553 | 0.648 |
| | Recall | 0.765 | 0.923 | 0.889 | 0.923 |
| | $F_1$ | 0.807 | 0.800 | 0.682 | 0.761 |
| ED | Precision | 0.765 | 0.520 | 0.524 | 0.548 |
| | Recall | 0.765 | 1.000 | 0.647 | 0.885 |
| | $F_1$ | 0.765 | 0.684 | 0.579 | 0.677 |

DATA STREAM CHANGE DETECTOR

CROSS-REFERENCE TO RELATED APPLICATIONS

This application claims the benefit of U.S. Provisional Application No. 60/865,465, filed Nov. 13, 2006, entitled "Data Stream Change Detector," which is hereby incorporated by reference in its entirety.

REFERENCE TO A COMPUTER PROGRAM LISTING APPENDIX

This application includes a computer program listing appendix which is hereby incorporated by reference in its entirety. The computer program listing appendix includes a single file recorded as ASCII text in IBM PC/MS DOS compatible files with the following name, size (in kilo bytes) and creation date: GMU-07-008U_Computer_Listing, 15,921 bytes (15.5 KB), Nov. 12, 2007. This file includes MATLAB code modules that illustrate several aspects of embodiments of the present invention. A portion of the disclosure of this patent document including said computer code contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

The problem of detecting changes in low-dimensional sequential data has been studied by statisticians for more than fifty years. Methods of change detection first appeared in the 1940s based on Wald's sequential analysis [Wald, 1947], in particular the sequential probability sequential test (SPRT) [Basseville and Nikiforov, 1993], and later, Page introduced the cumulative sum method [Page, 1954]. Recently, the machine learning and the data mining communities become interested in the change detection problem due to the need to discover changes in data, such as customer click streams, high-dimensional multimedia data, and retail chain transactions, generated from online processes that are not stationary [Domingos and Hulten, 2001]. The target concepts change over time. It is, hence, vital to detect the changes in the data generating processes so that timely decisions can be made.

One real-world problem that requires detecting changes is the video segmentation problem which corresponds to video-shot change or video break detection. Many algorithms [Gargi et al., 2000; Lefevre et al., 2003; Zhai and Shah, 2005] have been proposed to perform video-shot change detection. The range of existing methods includes pixel and histogram-based difference methods and motion-based methods (e.g. optical flow). Threshold selection, a critical step for successful change detection, is required by methods using global or local thresholds. For video sequences with clear and distinct shots, a single global threshold would be sufficient. For video sequences that have both abrupt and gradual changes between shots, however, a global threshold may not be found. To address such concerns [Gargi et al., 2000] argued for the use of local thresholds. The use of local thresholds requires choosing appropriate window size. Alternatively, Zhai and Shah [Zhai and Shah, 2005] proposed that video breaks should be detected using the deviation from some current model.

What is needed is a new technique to detect changes in high-dimensional streams of both labeled and unlabeled data.

DETAILED DESCRIPTION OF EMBODIMENTS

Disclosed is a martingale framework for detecting changes in a data stream such as a video data stream. Embodiments of this invention may be used in many applications that involve pattern recognition, data mining, machine learning and robotics. In particular, embodiments may be used for (video) surveillance, biometrics, internet security, and detection of fraud, anomalies and intrusion. Other uses may include some "classical" change-point problems such as quality control of continuous manufacturing process and monitoring of production process. Existing solutions are unimodal and thus limited to the detection of significant deviation from only one chosen quality characteristic of the product. Embodiments of the present invention are multi-dimensional and expand on previous works that attempt to detect deviations from a group or [large] number of quality characteristics.

Embodiments of the current invention use a clustering concept that is compatible with unlabeled data. The disclosed one-pass incremental change-detection technique (i) does not require a sliding window on the data stream, (ii) does not require monitoring the performance of the clustering algorithm as data points are streaming, and (iii) works well for high-dimensional data streams. To enhance the performance of the martingale change detector, the multiple martingale test technique using multiple views may be used. Experimental results show (i) the feasibility of the martingale technique for detecting changes in unlabeled data streams, and (ii) the multiple-martingale test technique compares favorably with alternative methods using the recall and precision measures for the video-shot change detection problem. The disclosed generic change detection technique for multidimensional data using martingale (i) is single-pass and incremental, (ii)

does not require a sliding window on the data stream, (iii) does not require monitoring the explicit performance of the classification or clustering model as data points are streaming, and (iv) works well for high-dimensional data streams. Additionally, embodiments of the disclosed change detector are non-parametric and should work on both labeled and unlabeled data. The technique has a theoretical false positive error bound for a given threshold, and the delay time between the true change point and the detected change point may be approximated. Embodiments of the disclosed martingale change detector may be applied to any problem whose representation can be rendered using a classification or clustering model.

Embodiments of the current invention include improvements upon a recently proposed a martingale method for change detection for high-dimensional labeled data streams. [Ho, 2005]. An adaptive support vector machine for time-varying data streams was proposed based on the martingale method [Ho and Wechsler, 2005a].

Contributions of currently disclosed embodiments are: (i) the extension of the martingale methodology to unlabeled data stream, and (ii) the multiple-martingale test based on multiple views (features). It is shown empirically that the martingale technique works well for unlabeled data stream and the multiple-martingale test compares favorably with alternative video-shot change detection methods for unlabeled video stream.

Figure 1:
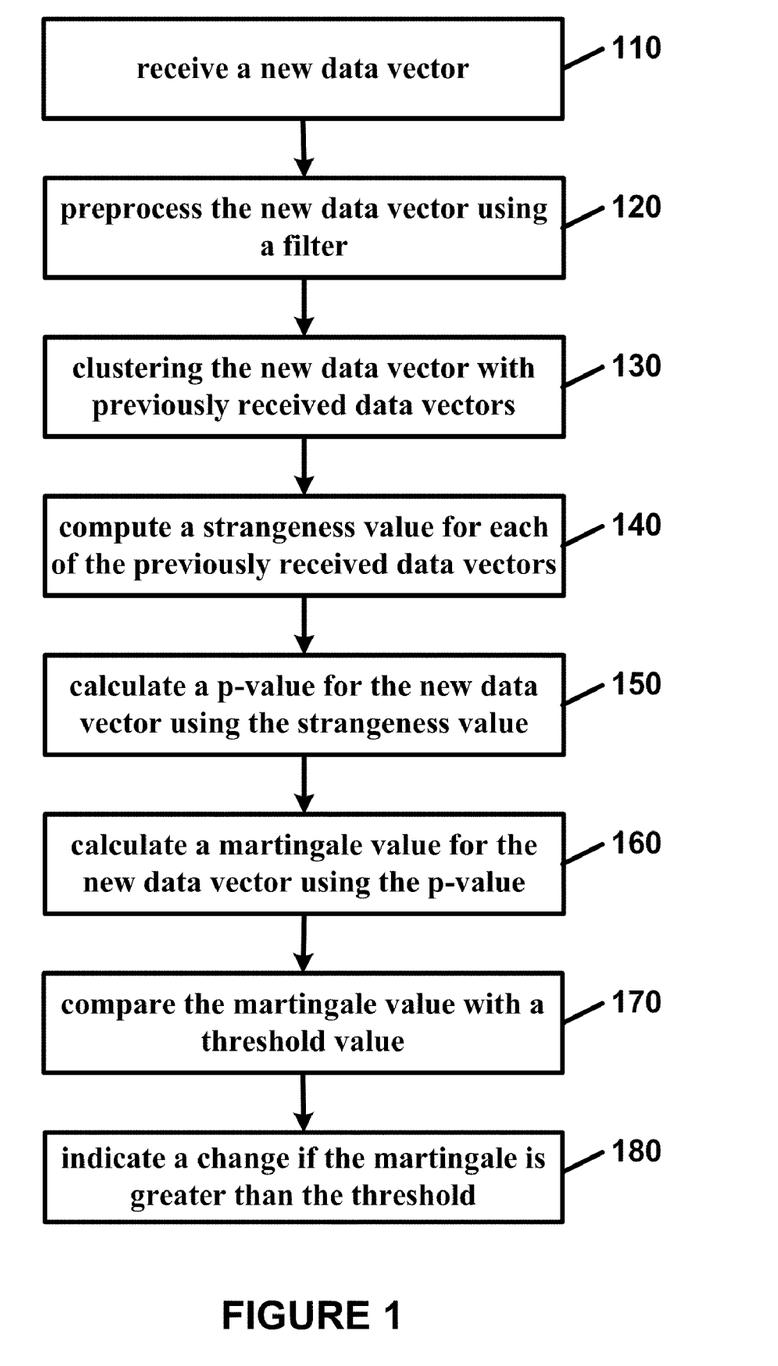
FIG. 1 is a flow diagram of an aspect of an embodiment of the present invention.

FIG. 1 is a flow diagram showing an embodiment of the present invention as a series of actions. The actions may be implemented in numerous ways including in software, hardware and firmware. The software may be in the form of a series of instructions residing on a computer readable medium that when executed by one or more processors, causes the one or more processors to cause at least part of the actions to occur. Hardware embodiments may use specific designs using digital and/or analog electronic hardware devices. The hardware designs may include programmable hardware devices such as ASICS, FPGAs and PALs. Firmware implementations may include a combination of software, processors and associated hardware devices.

As shown in FIG. 1, the actions for detecting changes in a data stream may include: receiving a new data vector at 110; preprocessing the new data vector using a filter at 120; clustering the new data vector with previously received data vectors at 130; computing a strangeness value for each of the previously received data vectors at 140; calculating a p-value for the new data vector using the strangeness value at 150; calculating a martingale value for the new data vector using the p-value at 160; comparing the martingale value with a threshold value at 170; and indicating a change if the martingale is greater than the threshold at 180. These actions may be repeated for a sequence of data in the data stream. Embodiments may be implemented such that the data stream may include various types of data including video data, audio data, and transactional data. In the case where the data stream includes video data, the data vector may include at least part of a video frame.

The data stream may be preprocessed using a filter. Examples of such filters include but are not limited to edge filters, frequency filters, and optical flow filters. In some embodiments, some or all of the above referenced actions may be repeated using different filters.

Exchangeability and Martingale

Let $\{Z_i: 1 \leq i < \infty\}$ be a sequence of random variables. A finite sequence of random variables $Z_1, \ldots, Z_i$ is exchangeable if the joint distribution $p(Z_1, \ldots, Z_i)$ is invariant under any permutation of the indices of the random variables. The satisfaction of exchangeability condition indicates that the distribution that the sequence of random variables is drawn from is stationary.

[Vovk et al., 2003] introduced the idea of testing exchangeability online using the martingale. A martingale is a sequence of random variables $\{M_i: 0 \leq i < \infty\}$ such that $M_n$ is a measurable function of $Z_1, \ldots, Z_n$ for all n=0, 1, . . . (in particular, $M_0$ is a constant value) and the conditional expectation of $M_{n+1}$ given $M_0, \ldots, M_n$ is equal to $M_n$, i.e.

$$E(M_{n+1}|M_1, \ldots, M_n) = M_n \qquad (1)$$

After each new data point is received, an observer outputs a positive martingale value reflecting the strength of evidence found against the null hypothesis of data exchangeability. The testing of exchangeability is used to detect changes in time-varying labeled data streams [Ho and Wechsler, 2005a].

Strangeness and p-Values

To apply the martingale method one needs to rank the data points according to their differences. Towards that end, one defines a strangeness measure that scores how much a data point is different from the other data points. Consider the set of labeled data points $Z = \{z_1, \ldots, z_{n-1}\}$ and the new labeled data point $z_n$. Each data point is assigned a strangeness value based on the classifier, such as the support vector machine (SVM) or the nearest neighbor rule, used to classify the data points $Z \cup \{z_n\}$ [Vovk et al., 2005].

To define a valid strangeness value for each data point, the simple assumption that at any time instance the strangeness value of each data point seen so far should be independent of the order these data points are used in the strangeness computation must be satisfied [Vovk et al., 2005]. For instance, when a k-nearest neighbor rule is used, the strangeness value of a particular data point is the ratio of the sum of the k-nearest data points with similar label ($S_s$) to the sum of the k-nearest data points with difference label ($S_d$). Hence, the higher $S_s$ is, the higher the strangeness value, and vice versa. On the other hand, when $S_d$ is high, the strangeness value is low. This is clearly a method that constructs valid strangeness values for labeled data points.

For unlabeled data, the strangeness measure is derived using clustering algorithm such as K-mean/median clustering with K=1. Consider the set of unlabeled data points $Z = \{z_1, \ldots, z_{n-1}\}$ and the new unlabeled data point $z_n$. The strangeness value $s_i$ of $z_i$ for i=1, . . . , n is $$s_i(Z, z_n) = \|z_i - C(Z \cup \{z_n\})\| \qquad (2)$$

where $C(\bullet)$ is some cluster representation and $\|\bullet\|$ is some distance measure. The strangeness value for a data point is high when it is further away from the cluster representation, e.g. the cluster center.

Next, a statistic is constructed to rank the strangeness value of the new data point $z_n$ with respect to the strangeness values of all the observed data points. The statistic, called the p-value of $z_n$, is defined as $$p\text{-value} = V(Z \cup \{z_n\}, \theta_n) = \frac{\#\{i: s_i > s_n\} + \theta_n \#\{i: s_i = s_n\}}{n} \qquad (3)$$

where $s_i$ is the strangeness measure for $z_i$, i=1, 2, . . . , n and $\theta_n$ is randomly chosen from [0,1].

The random number $\theta_n$ in (3) ensures that the p-values $p_1, p_2, \ldots$ output by the p-value function V are distributed uniformly in [0,1], provided that the input examples $z_1, z_2, \ldots$ are generated by an exchangeable probability distribution in the input space [Vovk et al., 2003]. This property of output p-values no longer holds when the exchangeability condition is not satisfied.

Change Detection Using Martingale

Intuitively, it may be assumed that a sequence of data points with a change consists of concatenating two data segments, $S_1$ and $S_2$, such that the data distribution of $S_1$ and $S_2$ are $P_1$ and $P_2$ respectively and $P_1 \neq P_2$. Switching a data point $z_i$ from $S_2$ to a position in $S_1$ will make the data point stand out in $S_1$. The exchangeability condition is, therefore, violated. Exchangeability is a sufficient condition for a stable data stream. The absence of exchangeability suggests the occurrence of change.

A family of martingales, indexed by $\varepsilon \in [0,1]$, and referred to as the power martingale, is defined as $$M_n^{(\varepsilon)} = \prod_{i=1}^{n}(\varepsilon p_i^{\varepsilon-1})  \quad (4)$$

where the $p_i$s are the output p-values from the function V, with the initial martingale $M_0^{(\varepsilon)}=1$. We note that $M_n^{(\varepsilon)}=\varepsilon p_n^{\varepsilon-1}M_{n-1}^{(\varepsilon)}$. Hence, it is not necessary to store the previous p-values. In our experiments, we use $\varepsilon=0.92$, which is within the desirable range where the martingale value is more sensitive to a violation of the exchangeability condition [Vovk et al., 2003].

The following theorem is applicable to both labeled and unlabeled data streams as long as the assumption (stated in Section 3) on the strangeness measure is satisfied.

Theorem 1 ([Ho and Wechsler, 2005b]) Let $\{M_i^{(\varepsilon)}: 0 \leq i < \infty\}$ be a martingale sequence of the form (4) constructed using p-values $\{p_i : 1 \leq i < \infty\}$ computed from (3) based on a valid strangeness measure for a given data stream:

1. If no change occurs in the given data stream, then $$P\left(\max_k M_k^{(\varepsilon)} \geq \lambda\right) \leq \frac{1}{\lambda}, \quad (5)$$

where $\lambda$ is a positive number.

2. Let $\alpha$ be the size of the test deciding in favor of the alternative hypothesis "change occurs in the data stream" when the null hypothesis "no change occurs in the data stream" is true and $1-\beta$ be the power of the test deciding in favor of the alternative hypothesis when it is true, the martingale test according to (5) is an approximation of the sequential probability ratio test (SPRT), with $$\lambda \leq \frac{1-\beta}{\alpha}, \quad (6)$$

and the mean delay time $E(m)$, i.e. the expected number of data points, m, observed before a change is detected, is approximated from the SPRT as follows:

$$E(m) \approx \frac{(1-\beta)\log\lambda}{E(L)} \quad (7)$$

where $$L = \log \varepsilon p_i^{\varepsilon-1} \quad (8)$$

A user selects a desirable threshold $\lambda$ for the martingale test (5) based on (6). To estimate the start of the change, (7) is used.

Experimental Result: Synthetic Unlabeled Data Stream

An artificial unlabeled data stream may be constructed as follows:

1. Randomly generate four sets of 1050 data points $S_1$, $S_2$, $S_3$, and $S_4$ from four overlapping Gaussian distributions with randomly generated mean with variance 1.
2. Concatenate $S_1$, $S_2$, $S_3$, and $S_4$ to form a sequence D consisting of 4200 data points such that $D=\{S_1; S_2; S_3; S_4\}$.

Figure 2A:
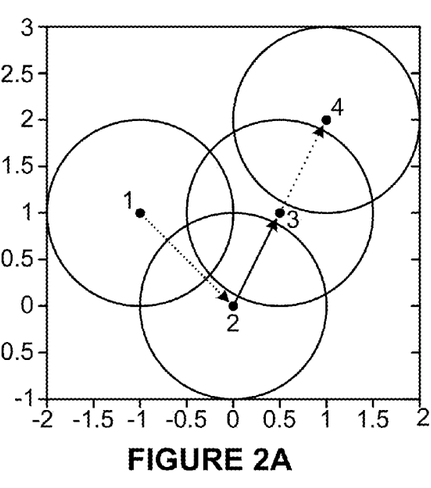
FIG. 2A is a sketch of four overlapping 2-dimensional Gaussian distributions and the way the data sequence changes in distribution.

FIG. 2(a) shows a sketch of four overlapping 2-dimensional Gaussian distributions generated by Step 1 of the above procedure. The data distribution of the data sequence D changes with 3 change points.

Figure 2B:
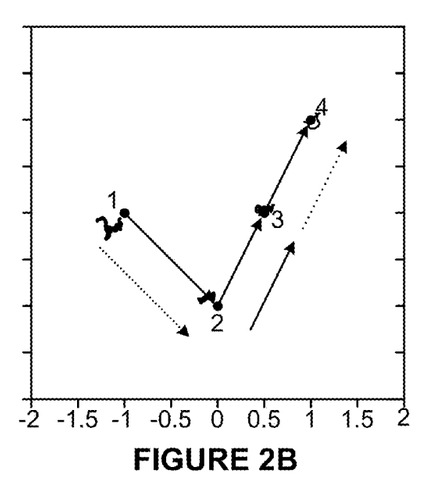
FIG. 2B shows the trajectory of the center of the 1-mean cluster as data points are observed one by one.
Figure 2C:
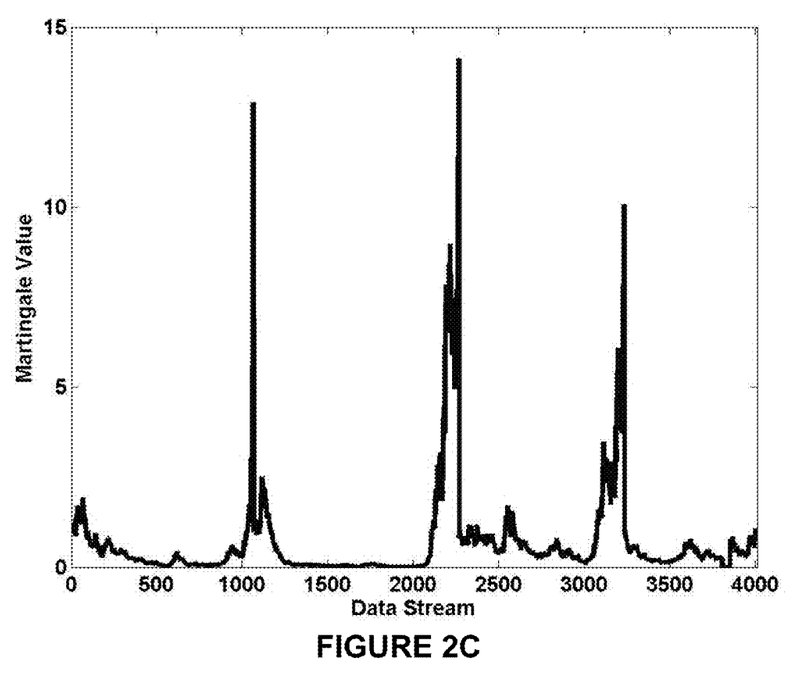
FIG. 2C shows the martingale values of the 10-D synthetic unlabeled data stream with 3 change points.

In the experiment, the first 50 points from D is first used to compute the center of the initial 1-mean cluster with strangeness of each data point computed using (2) with the Euclidean distance. The threshold $\lambda$ value for the martingale test is set to 10. The data points from the data stream D are observed sequentially. The cluster center is updated. Strangeness for all seen data points may be computed. The martingale at each instance may be computed using (4) based on the computed p-values from (3). When the martingale value is greater than $\lambda$, a change in the mean of the Gaussian distribution is detected. All previously seen data points are preferably removed. The martingale is reset to 1. The next 50 data points may be used to construct a new 1-mean cluster. The process can repeats till the data points in D are exhausted.

Figure 3:
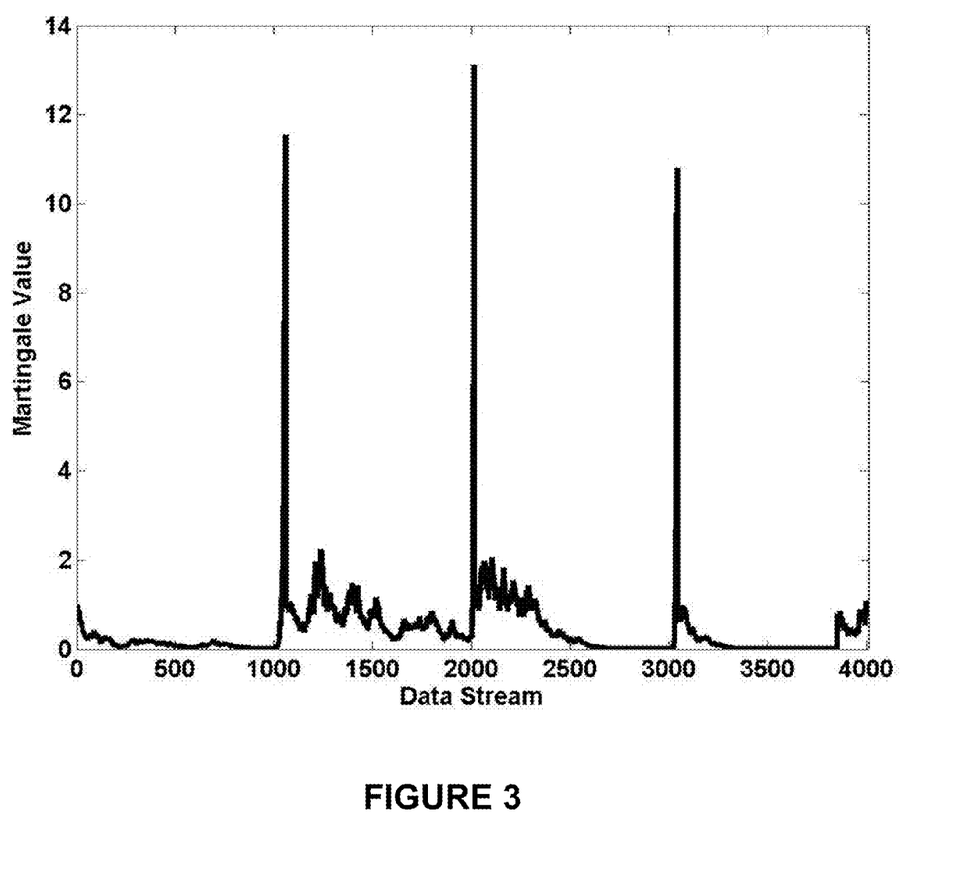
FIG. 3 shows martingale values of the 10-D synthetic unlabeled data stream with 3 change points.

FIG. 2B shows the trajectory of the center of 1-mean cluster in the experiment. The theoretical basis for signaling a change is (5). FIG. 2C shows the martingale values. Detection occurs when the martingale value is greater than $\lambda=10$. The true change points are at data points 1000, 2000 and 3000. The dimension of the Gaussian distribution is then increased to 10. FIG. 3 shows that the changes in mean parameter of the high-dimensional Gaussian distribution are detected as well.

It may be noted that in some real-world problems, more than one data feature is good in representing the data. In order to utilize this observation to improve the sensitivity and performance of the martingale test, one can perform a number of martingale tests constructed based on different characteristics or features of the data.

Multiple-Martingale Test Using Multi-Views

In the multi-view learning problem, an example z is represented by a number of feature subsets. Each feature subset describes a view of the example [Muslea et al., 2002]. The multi-view setting is closely related to co-training [Blum and Mitchell, 1988].

For the multiple-martingale test, the multi-view setting may be considered such that each constructed martingale attempts to identify changes with respect to the particular feature subset. Besides the fact that the features are extracted from the original data, the feature subsets should be independent of one another to minimize redundancy.

It may be noted that according to the martingale theory, the data representation does not affect the probability bound (5). On the other hand, Corollary 1 When the multiple martingale test with M-views is used for change detection, the expected number of data points, m, observed before a change point is detected, $$E^*_M(m) \leq E(m) \tag{9}$$

Obviously, one can conclude that the number of missed detections using the multiple-martingale test is upper-bounded by the number of missed detections using the original martingale method. Moreover, the number of false alarms using the multiple martingale test may be lower-bounded by the number of false alarms using the original martingale method.

Algorithm 1 is the multiple-martingale test with two views. The algorithm may be extended to M>2.

Algorithm 1: Multiple-Martingale Test with M-View, M=2
Initialize: $M_1(0)=M_2(0)=1$; i=1; T={ }.
Set: λ
1: loop
2: A new unlabeled example $x_i$ is observed.
3: Construct the two views/features from $x_i$, i.e., $\bar{x}_i = \{f_{i1}, f_{i2}\}$.
4: Compute the strangeness measure $\vec{s}_1$ and $\vec{s}_2$ (vectors containing strangeness for seen examples) using (2) from $\{f_{11}, \ldots, f_{i1}\}$ and $\{f_{12}, \ldots, f_{i2}\}$.
5: Compute the p-values $p_1$ and $p_2$ from $\vec{s}_1$ and $\vec{s}_2$, respectively, using (3).
6: Compute $M_1(i)$ and $M_2(i)$ from $p_1$ and $p_2$ using (4).
7: if $M_1(i) > \lambda$ OR $M_2(i) > \lambda$ then
8: CHANGE DETECTED
9: Set $M_1(i)$ and $M_2(i)$ to 1;
10: Re-initialize T to an empty set.
11: else
12: Add $x_i$ into T.
13: endif
14: i:=i+1;
15: endloop Video-Shot Change Detection Problem A method of constructing valid strangeness for video stream has been described. Later, the martingale test method and motivate using the multiple-martingale test on detecting changes in video stream is analyzed. Then, a comparison of multiple martingale test techniques with alternative video-shot change detection methods is made.

Strangeness Measure for Video Stream

The representation and the strangeness measure for an unlabeled video image is described in this subsection.

Image Representation Using Color and Edge Histograms

Image representations may be based on the color and edge histograms. A color histogram may constructed with 4096 bins. [(r/16)*256+(g/16)*16+b/16] used to convert RGB values of a pixel into an index, with integer division where r, g and b are red, green and blue values respectively. The edge histogram may consist of 36 bins such that a gradient angle is converted into an index by dividing the orientation angle by 10 and rounding to the nearest integer.

To capture local information from an image frame, the image frame may be partitioned such that a histogram is constructed for each area partitioned along either the horizontal or the vertical axis. For example, for a 352×240 image, histograms may be constructed on 3 areas of 88×240 by partitioning along the horizontal axis and 3 areas of 352×80 by partitioning along the vertical axis. Using this construction, there may be two image representations: one consisting of six color histograms, $R_{cc}=\{H_c^1, H_c^2, H_c^3, H_c^4, H_c^5, H_c^6\}$, and one consisting of six edge histograms, $R_{ee}=\{H_e^1, H_e^2, H_e^3, H_e^4, H_e^5, H_e^6\}$. The two image representations may be used as the two views in Algorithm 1.

Strangeness Measure of the Image Representations, $R_{cc}$ and $R_{ee}$

Consider the set of image representations, i.e. $Z=\{R_1, \ldots, R_{(n-1)}\}$ and a new image representation $R_n$ in the form of either $R_{cc}$ or $R_{ee}$. First, define $$\Omega = \max(Z \cup \{R_n\}) \tag{10}$$

which contains the maximum value for each bin in the histograms of the image representation.

It should be noted that as the number of observed image frames increases, $\|\Omega\|$, where $\|\cdot\|$ is some distance measure, is monotonically increasing. $\Omega$ ensures that the cluster center will maintain information from previously observed image frames and not be affected by a small drift in image content when a new image frame is observed. The effect of a small drift in image content is significant when the mean, median or minimum value is used. $\Omega$ assumes the role of the cluster center for the images.

The difference between the image representation $R_i$, i=1, ..., n and $\Omega$ are of interest. Using the Euclidean norm, the strangeness value for $R_i$ is $$s_i(Z, R_n) = \sqrt{\sum_{k=1}^{No.ofbins} (R_i(k) - \Omega(k))^2} . \tag{11}$$

This strangeness measure is valid for an image representation $R_i$ in the form of either $R_{cc}$ or $R_{ee}$ as it satisfies the assumption in Section 3. The set of computed strangeness values $\{s_1, \ldots, s_n\}$ for $R_i$, i=1, ..., n is used to compute the p-value of $R_n$ using (3).

Characteristics of the Martingale Method for Video Stream

Figure 4:
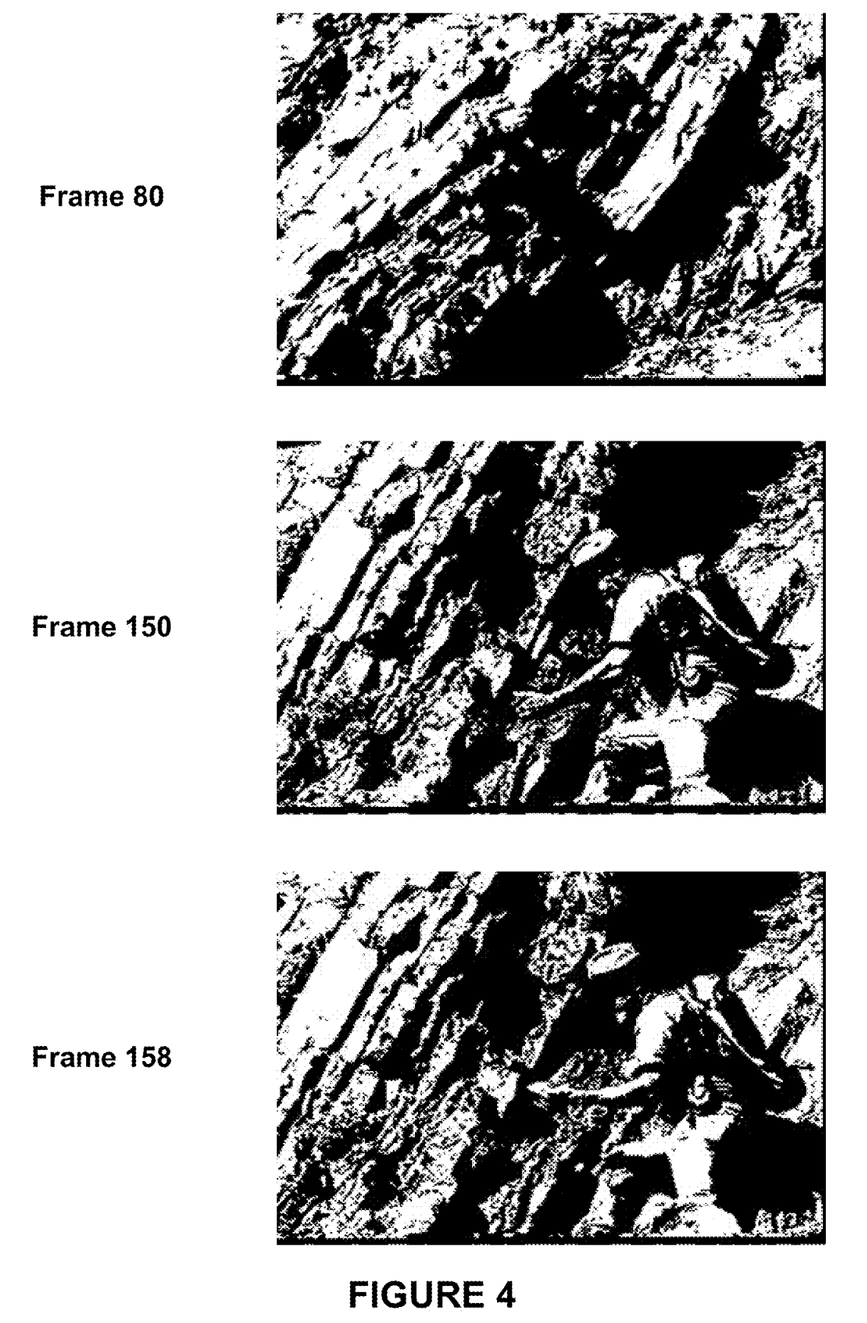
FIG. 4 shows a series of example frames where a human starts to appear.

Consider the example shown in FIG. 4, we use the image representation $R_{cc}$ and the threshold value $\lambda=10$ to demonstrate some characteristics of the martingale method.

Figure 5:
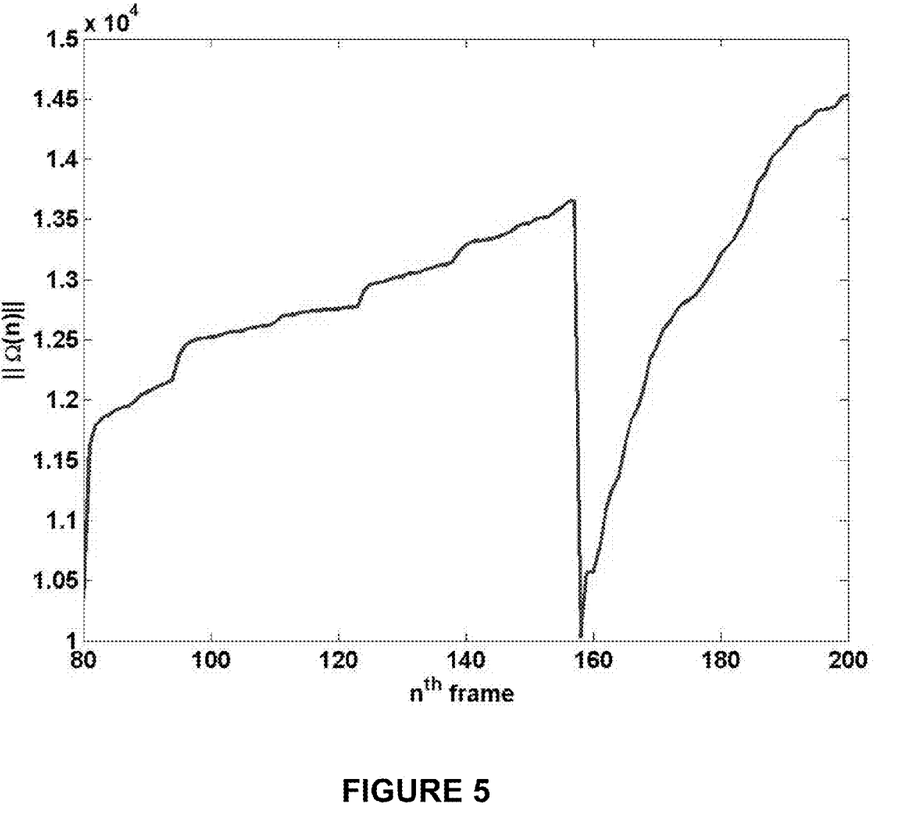
FIG. 5 shows the characteristic of $\Omega_c$ using the image representation $R_{cc}$ when the video sequence of FIG. 3 is nearly stationary and after a shot change is detected at Frame 158.

The characteristic of $\Omega_c$ (for color histogram representation, $R_{cc}$) is shown in FIG. 5. The shot change is detected at Frame 158 and all previous information is removed from the memory. Unlike labeled data stream where the data-generating process changes at some particular time instances [Ho, 2005; Ho and Wechsler, 2005b], the unlabeled video sequence is usually non-stationary, with constant small changes. The "cluster" representation $\Omega_c$ should be either (i) insensitive to small changes or (ii) maintain most information from the previously observed data. $\Omega_c$ satisfies the two criteria.

Figure 6:
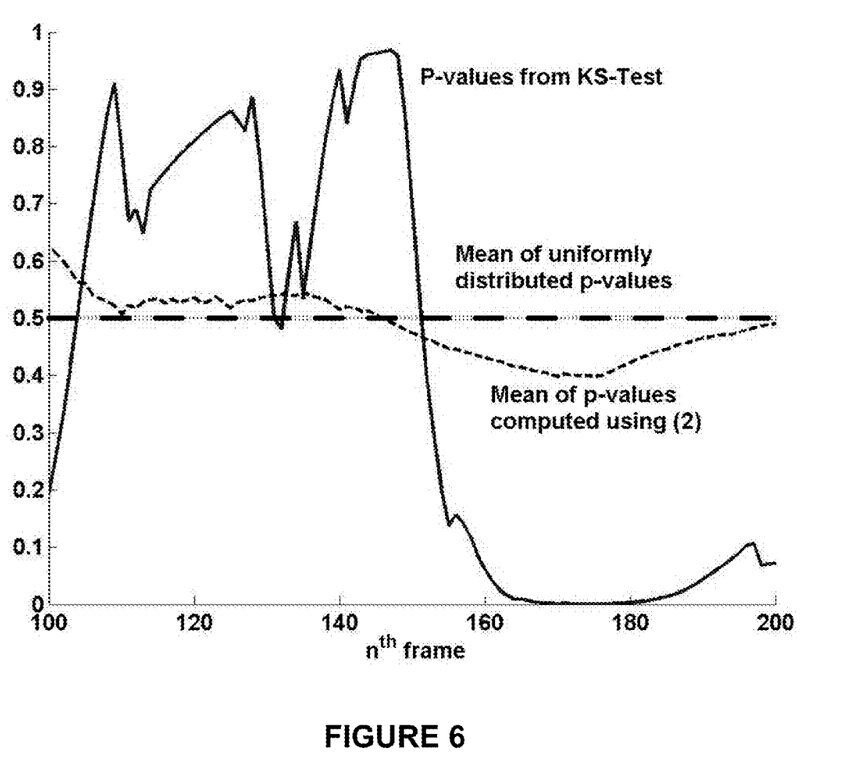
FIG. 6 shows the characteristics of p-values computed using (3) and the image representation $R_{cc}$ on the video sequence of FIG. 4.

The Kolmogorov-Smirnov test (KS-Test) may be performed to see whether the p-values computed using (3) is uniformly distributed when the video content is nearly stationary. This property of p-values computed using (3) does not hold when the video sequence no longer satisfies the exchangeability condition. The mean of the p-values lowers and the martingale values start to increase. In this experiment, the martingale method is performed without reacting to shot change detected, removing data points and resetting variables. In FIG. 6, it is observed that with high confidence (based on p-values obtained from the KS-Test) the p-values computed using (3) is uniformly distributed before Frame 163. After Frame 163, the p-values are no longer uniformly distributed at 0.05 significance level.

Figure 7:
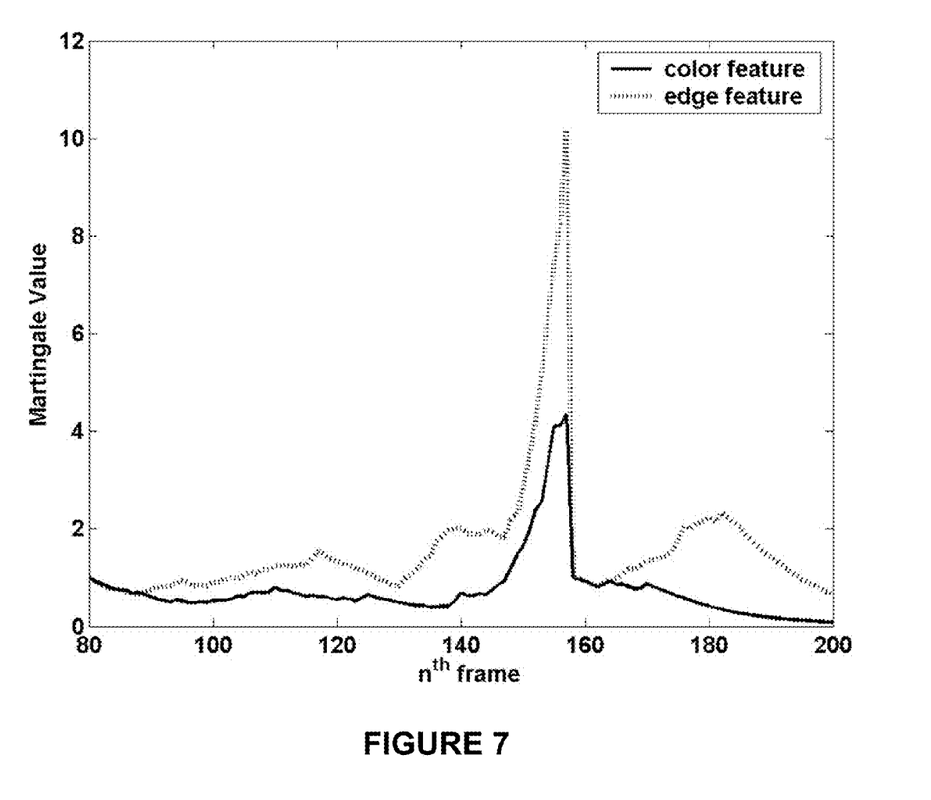
FIG. 7 shows characteristics of martingale values $M_n$ using both the image representations $R_{cc}$ and $R_{ee}$ on the example in FIG. 4.

FIG. 7 shows the martingale values computed using the color feature, $R_{cc}$ and the edge feature, $R_{ee}$. One notes that for this particular example shown in FIG. 4, the edge feature is more sensitive than the color feature. The martingale values computed using the edge feature increase faster and higher than the ones computed using the color feature near the image frame where the change occurs. Hence, by using the multiple-martingale test with 2 views, the number of image frames observed before detecting the change point is lowered. Hence, the sensitivity of the martingale method can be increased using multiple views.

Comparison with Alternative Methods

Experiments were performed to compare the multiple-martingale test with alternative methods. Four sets of videos, consisting of two documentary video streams (anni, ugs) and two video streams from hand-held digital video camera (outdoor, indoor), are used. The documentary videos can be obtained freely from open-video.org. The "anni" video stream consists of 9 shots and 8 gradual transitions between shots. The "ugs" video stream consists of 13 shots with some fast transitions and moving camera. The "outdoor" and "indoor" video streams consist of continuous changes due to the motion of the camera. The two video streams are captured from the top of a hill and from an apartment, respectively.

The performance of the methods may be measured based on the number of detections, miss detections and false detections. They are summarized using the recall, precision and the $F_1$ measure:

$$\text{Precision} = \frac{NumberofCorrectDetections}{NumberofDetections}$$

$$\text{Recall} = \frac{NumberofCorrectDetections}{NumberofTrueChanges}$$

$$F_1 = \frac{2 \times \text{Recall} \times \text{Precision}}{\text{Recall} + \text{Precision}}$$

Precision is the probability that a detection is actually correct, i.e. detecting a true change. Recall is the probability that a change detection system recognizes a true change. $F_1$ measure represents a harmonic mean between recall and precision. A high value of $F_1$ measure ensures that the precision and recall are reasonably high.

Figure 8:
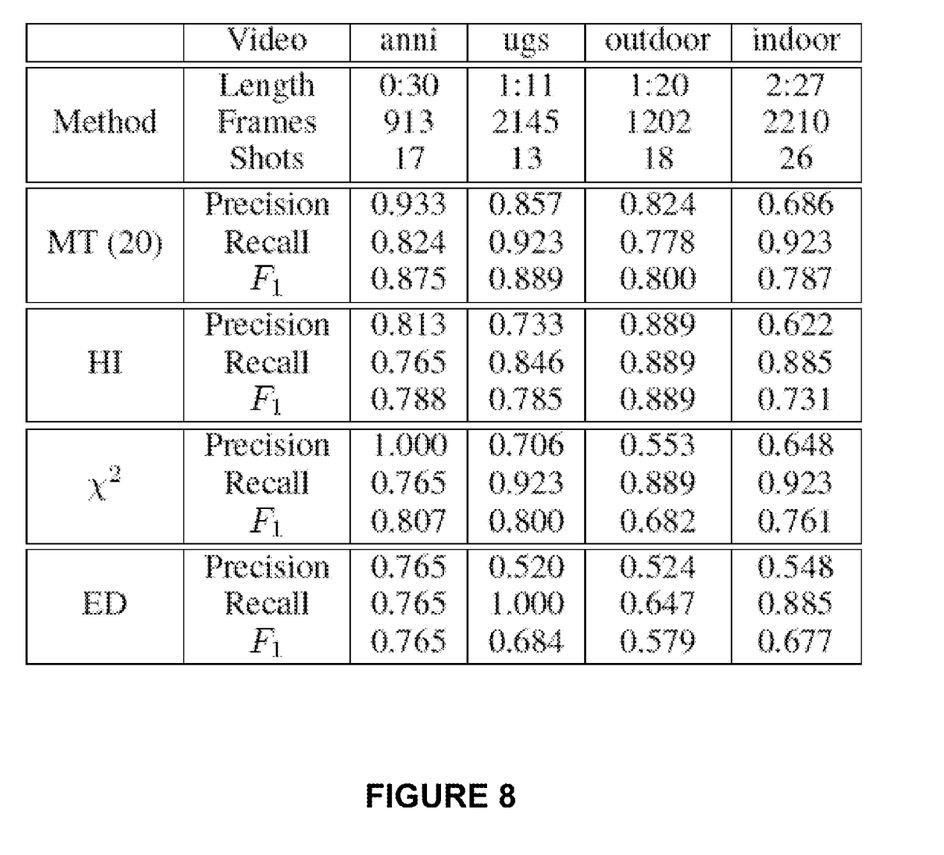
FIG. 8 is a Table showing experimental results using an aspect of an embodiment of the present invention.

In the experiment, $\lambda=20$ is used. This value corresponds to the fact that the computed martingale values are unlikely to be higher than 20 with probability bound of 0.05 if no change occurs. The multiple-martingale test (MT (20)) is compared with the alternative methods. For the alternative methods, the color histogram is used as the image representation and the local threshold is selected based on window averaging [Gargi et al., 2000] on three similarity measures: histogram intersection (HI), chi-square measure ($\chi^2$) and Euclidean distance (ED), to measure the similarity between any two image frames for all the image frames in a video sequence. The parameters, such as the window size, are varied so that the best results can be obtained from the alternative methods. The experimental results on the four video sequences are shown in FIG. 8.

Based on the $F_1$ measure, the multiple-martingale test performed the best three out of the four video sequences. The main difference between the alternative methods and those of the present embodiments is the fact that the threshold for the present embodiments is chosen a prior with theoretical consideration while the thresholds selected by the alternative methods are heuristics such that the window size and other parameters need to be tuned to achieve good result. Moreover, the martingale embodiments used only require one-pass while the alternative methods are not.

Embodiments of the present invention extend the martingale methodology [Ho, 2005] to be used on unlabeled data.

Also disclosed is a multiple-martingale test based on building different martingales using multiple views (features) to enhance the performance of the martingale methodology. This multiple martingale test method is applied to the video-shot change detection and show that it compares favorably with alternative methods.

Figure 9:
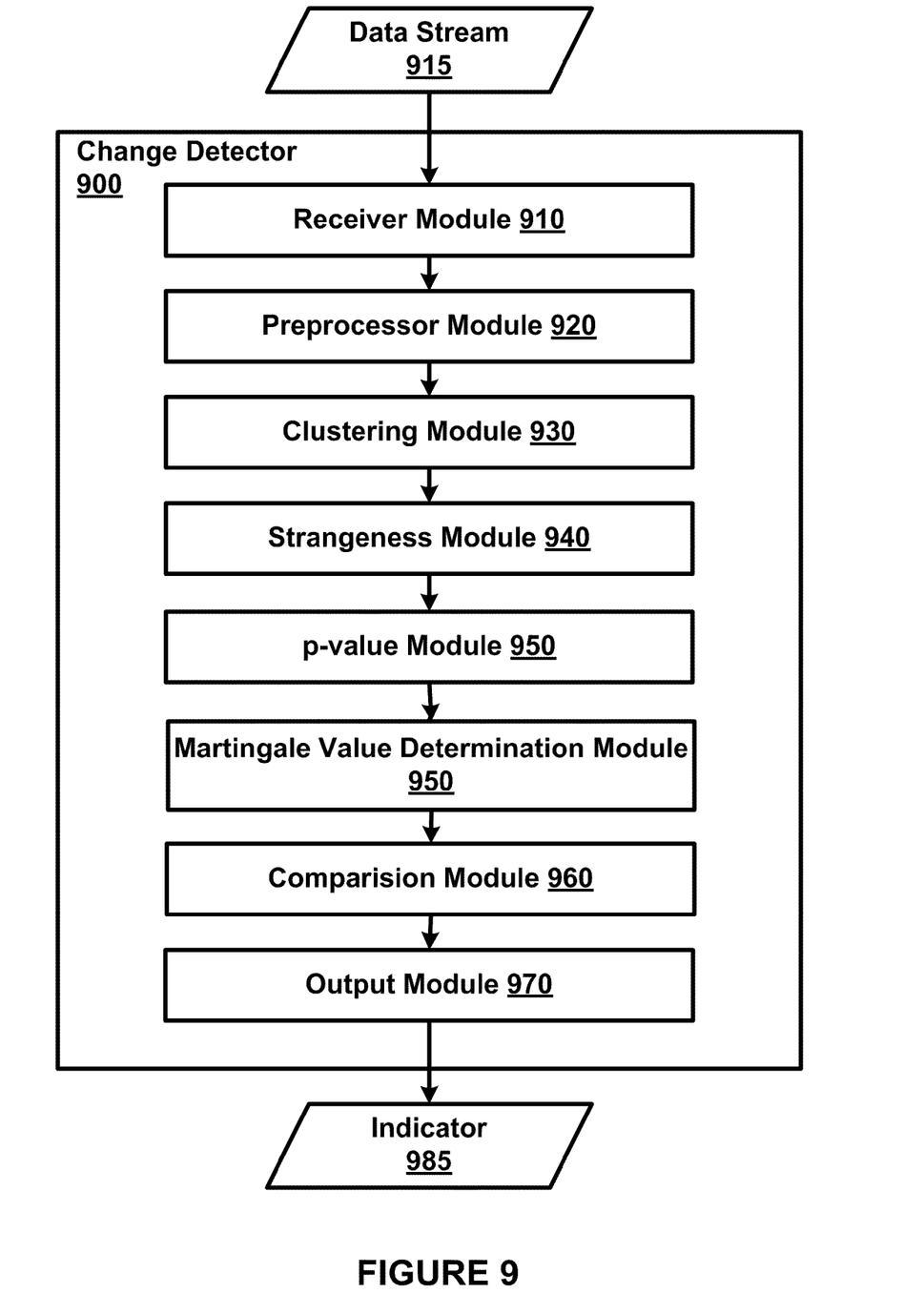
FIG. 9 is a block diagram of a data stream change detector as per an aspect of an embodiment of the present invention.

A block diagram of an embodiment of a data stream change detector 900 as per an aspect of the present invention is shown in FIG. 9. The data stream change detector 900 includes a receiving module 910, a preprocessor module 920, a clustering module 930, a strangeness module 940, a p-value module 950, a martingale value determination module 960, comparison module 970, and an output module 980.

It is envisioned that embodiments may be built many different ways. For instance, the various modules described in this disclosure may exist separately or in combination, either physically or logically. In this context, the term module means a self-contained component of a system, capable of interfacing with other components. In particular, it is anticipated that embodiments of the present invention may be constructed using software or hardware. Additionally, it is reasonable that modules identified in this disclosure may be created using other modules. Module(s) may actually be a self contained program(s) or series of programs that may reside on one or more computers. Computers in this disclosure may be a general purpose computer, an application specific computer, an application appliance, a server or the like. When the modules reside on multiple separate computers, those computers may be part of a bank of related computers or be a collection of independent computers. It is even possible that some modules may reside on multiple computers that are configured to communicate through a network. The modules may be stored on a tangible computer readable medium as a series of processor executable instructions that when executed by one or more processors, performs their useful function. Similarly, a module may be constructed using hardware such as an ASIC, an FPGA, or discrete hardware. This may be useful in some instances to provide fast processing.

The receiving module 910 is preferably configured to accept a new data vector 915. The new data vector may be part of a stream of data 915. The data stream change detector 900 may operate on a sequence of data in the data stream 915. The data may include many types of data including at least part of a video frame or other video data, audio data, transactional data, or the like.

Preprocessor module 920 is preferably configured to pre-process the new data vector. The preprocessing module 920 may use a filter. The filter may include many types of filters individually, or in combination. Examples of filters include an edge filter; a frequency filter; an optical flow filter; or the like.

The clustering module 930 is preferably configured to cluster the new data vector with previously received data vectors. Strangeness module 940 is preferably configured to compute a strangeness value for each of the previously received data vectors. The p-value module 950 is preferably configured to calculate a p-value for the new data vector using the strangeness value. Martingale value determination module 960 is preferably configured to calculate a martingale value for the new data vector using the p-value. Comparison module 970 is preferably configured to: compare the martingale value with a threshold value; and set an indicator if a change if the martingale is greater than the threshold. Output module 980 is preferably configured to output the indicator 985.

Another embodiment of the present invention may be a computer readable medium where the computer readable medium comprising a series of instructions for detecting changes in a data stream. The series of instructions may be configured to cause one or more processors to: receive a new data vector; preprocess the new data vector using a filter; cluster the new data vector with previously received data vectors; compute a strangeness value for each of the previously received data vectors; calculate a p-value for the new data vector using the strangeness value; calculate a martingale value for the new data vector using the p-value; compare the martingale value with a threshold value; and indicate a change if the martingale is greater than the threshold.

The following references are included to facilitate the understanding of the present embodiments.

[1] Michèle Basseville and Igor V. Nikiforov. Detection of Abrupt Changes: *Theory and Application*. Prentice Hall, 1993.

[2] Avrim Blum and Tom M. Mitchell. Combining labeled and unlabeled sata with co-training. In COLT, pages 92-100, 1998.

[3] Pedro Domingos and Geoff Hulten. Catching up with the data: Research issues in mining data streams. In DMKD, 2001.

[4] Ullas Gargi, Rangachar Kasturi, and Susan H. Strayer. Performance characterization of video-shot-change detection methods. IEEE Trans. Circuits Syst. Video Techn., 10(1):1-13, 2000.

[5] Shen-Shyang Ho and Harry Wechsler. Adaptive support vector machine for time-varying data streams using martingale. In Leslie Pack Kaelbling and Alessandro Saffiotti, editors, IJCAI, pages 1606-1607. Professional Book Center, 2005.

[6] Shen-Shyang Ho and Harry Wechsler. On the detection of concept change in time-varying data streams by testing exchangeability. In Proc. 21st Conference on Uncertainty in Artificial Intelligence, pages 267-274, 2005.

[7] Shen-Shyang Ho. A martingale framework for concept change detection in time-varying data streams. In Luc De Raedt and Stefan Wrobel, editors, ICML, pages 321-327. ACM, 2005.

[8] Sébastian Lefevre, Jérôme Holler, and Nicole Vincent. A review of real-time segmentation of uncompressed video sequences for content-based search and retrieval. Real-Time Imaging, 9:73-98, 2003.

[9] Ion Muslea, Steven Minton, and Craig A. Knoblock. Active+semi-supervised learning=robust multi-view learning. In Claude Sammut and Achim G. Hoffmann, editors, ICML, pages 435-442. Morgan Kaufmann, 2002.

[10] E. S. Page. Continuous inspection schemes. Biometrika, 41:100-115, 1954.

[11] Vladimir Vovk, Ilia Nouretdinov, and Alexander Gammerman. Testing exchangeability on-line. In Tom Fawcett and Nina Mishra, editors, ICML, pages 768-775. AAAI Press, 2003.

[12] Vladimir Vovk, Alex Gammermann, and Glenn Shafer. Algorithmic Learning in a Random World. Springer, New York, 2005.

[13] A. Wald. Sequential Analysis. Wiley, N.Y., 1947.

[14] Y. Zhai and Mubarak Shah. A general framework for temporal video scene segmentation. In Proc. 10th International Conference on Computer Vision, Beijing, China, 2005.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above described exemplary embodiments. In particular, it should be noted that, for example purposes, the above explanation has focused on the example(s) of embodiments and experiments that detect changes in video data streams. In fact, it is anticipated that the embodiments of the present invention may be used to detect changes in other types of data streams such as audio data streams. This kind of change data may be used for applications such as surveillance triggering.

In addition, it should be understood that any figures which highlight the functionality and advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

What is claimed is:

1. A data stream change detector comprising one or more processors to detect changes in a data stream including:
   a) a receiving module configured to accept a new data vector;
   b) a preprocessing module configured to preprocess the new data vector using a filter;
   c) a clustering module configured to cluster the new data vector with previously received data vectors, the new data vector and the previously received data vectors being clustered including unlabeled data;
   d) a strangeness module configured to compute a strangeness value for each of the previously received data vectors;
   e) a p-value module configured to calculate a p-value for the new data vector using the strangeness value;
   f) a martingale value determination module configured to calculate a martingale value for the new data vector using the p-value;
   g) a comparison module configured to:
      i) compare the martingale value with a threshold value; and
      ii) set an indicator if a change of the martingale is greater than the threshold; and
   h) an output module configured to output the indicator.

2. The data stream change detector according to claim 1, wherein the data stream change detector is configured to operate on a sequence of data in the data stream.

3. The data stream change detector according to claim 1, wherein the data vector includes at least part of a video frame.

4. The data stream change detector according to claim 1, wherein the data stream includes video data.

5. The data stream change detector according to claim 1, wherein the data stream includes audio data.

6. The data stream change detector according to claim 1, wherein the data stream includes transactional data.

7. The data stream change detector according to claim 1, wherein the preprocessing module uses a filter.

8. The data stream change detector according to claim 7, wherein the filter includes at least one of the following filters:
   a) an edge filter;
   b) a frequency filter;
   c) an optical flow filter; or
   d) a combination of at least two of the above.

9. The data stream change detector according to claim 1, wherein the cluster comprises at least one of:
   a) a K-mean cluster; or
   b) a K-median cluster.

10. The data stream change detector according to claim 1, wherein the strangeness value comprises:
    a) a cluster representation; and
    b) a distance measure.

11. The data stream change detector according to claim 1, further comprising
    a plurality of views/features.

12. A method, implemented by one or more processors, the method comprising:
    a) receiving a new data vector;
    b) preprocessing the new data vector using a filter;
    c) clustering the new data vector with previously received data vectors, the new data vector and the previously received data vectors being clustered including unlabeled data;
    d) computing a strangeness value for each of the previously received data vectors;
    e) calculating a p-value for the new data vector using the strangeness value;
    f) calculating a martingale value for the new data vector using the p-value;
    g) comparing the martingale value with a threshold value; and
    h) indicating a change if the martingale is greater than the threshold.

13. The method according to claim 12, wherein the method is repeated for a sequence of data in the data stream.

14. The method according to claim 12, wherein the data vector includes at least part of a video frame.

15. The method according to claim 12, wherein the data stream includes video data.

16. The method according to claim 12, wherein the data stream includes audio data.

17. The method according to claim 12, wherein the data stream includes transactional data.

18. The method according to claim 12, wherein the filter includes at least one of the following filters:
    a) an edge filter;
    b) a frequency filter;
    c) an optical flow filter; or
    d) a combination of at least two of the above.

19. The method according to claim 12, further including repeating actions 1-b through 1-h with different filters.

20. A non-transient computer readable medium, the non-transitory computer readable medium comprising a series of instructions executable on a computer to detect changes in a data stream, the series of instructions being configured to cause one or more processors to: receive a new data vector; preprocess the new data vector using a filter; cluster the new data vector with previously received data vectors, the new data vector and the previously received data vectors being clustered including unlabeled data; compute a strangeness value for each of the previously received data vectors; calculate a p-value for the new data vector using the strangeness value; calculate a martingale value for the new data vector using the p-value; compare the martingale value with a threshold value; and indicate a change if the martingale is greater than the threshold.

21. The non-transitory computer readable medium according to claim 20, wherein the processors: receive a sequence of data in the data stream.

22. The non-transitory computer readable medium according to claim 20, wherein the data vector includes at least part of a video frame.

23. The non-transitory computer readable medium according to claim 20, wherein the filter includes at least one of the following filters:
    a) an edge filter;
    b) a frequency filter;
    c) an optical flow filter; or
    d) a combination of at least two of the above.

* * * * *